TELEPHONE SYSTEM DIAL BACK TRUNK

Filed March 10, 1958 6 Sheets-Sheet 1

INVENTOR.
EDWARD J. GLENNER
BY C. A. Gulbrandsen
ATTY.

INVENTOR.
EDWARD J. GLENNER
BY C. A. Gulbrandsen
ATTY.

Jan. 19, 1960 E. J. GLENNER 2,921,988

TELEPHONE SYSTEM DIAL BACK TRUNK

Filed March 10, 1958 6 Sheets-Sheet 3

INVENTOR.
EDWARD J. GLENNER
BY C. A. Gullbrandsen
ATTY.

INVENTOR.
EDWARD J. GLENNER
BY
C. A. Bullbrandsen
ATTY.

Jan. 19, 1960 E. J. GLENNER 2,921,988

TELEPHONE SYSTEM DIAL BACK TRUNK

Filed March 10, 1958 6 Sheets-Sheet 5

INVENTOR.
EDWARD J. GLENNER

BY C. A. Gullbrandsen

ATTY.

INVENTOR.
EDWARD J. GLENNER
BY
C. A. Gulbrandsen
ATTY.

2,921,988
Patented Jan. 19, 1960

2,921,988

TELEPHONE SYSTEM DIAL BACK TRUNK

Edward J. Glenner, Chicago, Ill., assignor to General Telephone Laboratories, Incorporated, Northlake, Ill., a corporation of Delaware Application March 10, 1958, Serial No. 720,496

9 Claims. (Cl. 179—27)

This invention relates to telephone systems in general, but more particularly to toll switching systems in which all toll connections within a certain area are established and supervised from a main toll board.

In telephone systems extending over an area including several more or less widely scattered communities or exchanges interconnected by toll or long distance lines, the practice of completing and supervising all connections between the exchanges of the different communities, as well as all connections to the outside points, from the main toll board located in one of the exchanges is often advantageously followed. An advantage of this practice is that it eliminates the toll operator at each of the separate exchanges. In large telephone systems of this kind each exchange is not connected directly with every other exchange in the system, but is usually connected with only one or two of the closer exchanges. For this reason special consideration must be given to the methods employed in carrying out the above practice in order that it may be done in the most economical manner, both in regard to the amount of equipment needed and in regard to the trunks used.

The general object of this invention consists in the provision of improved circuits for use in a telephone system as described above whereby the toll operator may be called from any one of the exchanges over one of the trunks extending to the exchange in which the toll board is located and whereby the toll operator may then control the establishment of the desired connection over the most direct route and maintain supervision thereby over that same line.

Another object is to provide a trunk circuit for extending outgoing calls to a toll operator at a distance toll exchange who may extend the call beyond the toll exchange or may dial through the repeater exchange. The operator retaining supervision of the call.

Another object is to provide a trunk circuit which permits removal of the trunk bridge in the transmission path during the set up calls conversation period, while retaining intact the supervisory paths on calls dialed back through the trunk circuit.

Another object is to provide a trunk circuit for use in an automatic central office whereby person-to-person calls originating therein can be completed by the operator at a distant exchange, and said trunk circuit is also accessible from switch trains.

A further object is to provide a trunk circuit for use with carrier or radio links between the branch exchange and the operator exchange.

Further objects and features of the present invention pertain to the particular arrangement of the various circuit elements of the system, whereby the above objects and additional operating features are attained.

Figure 1:
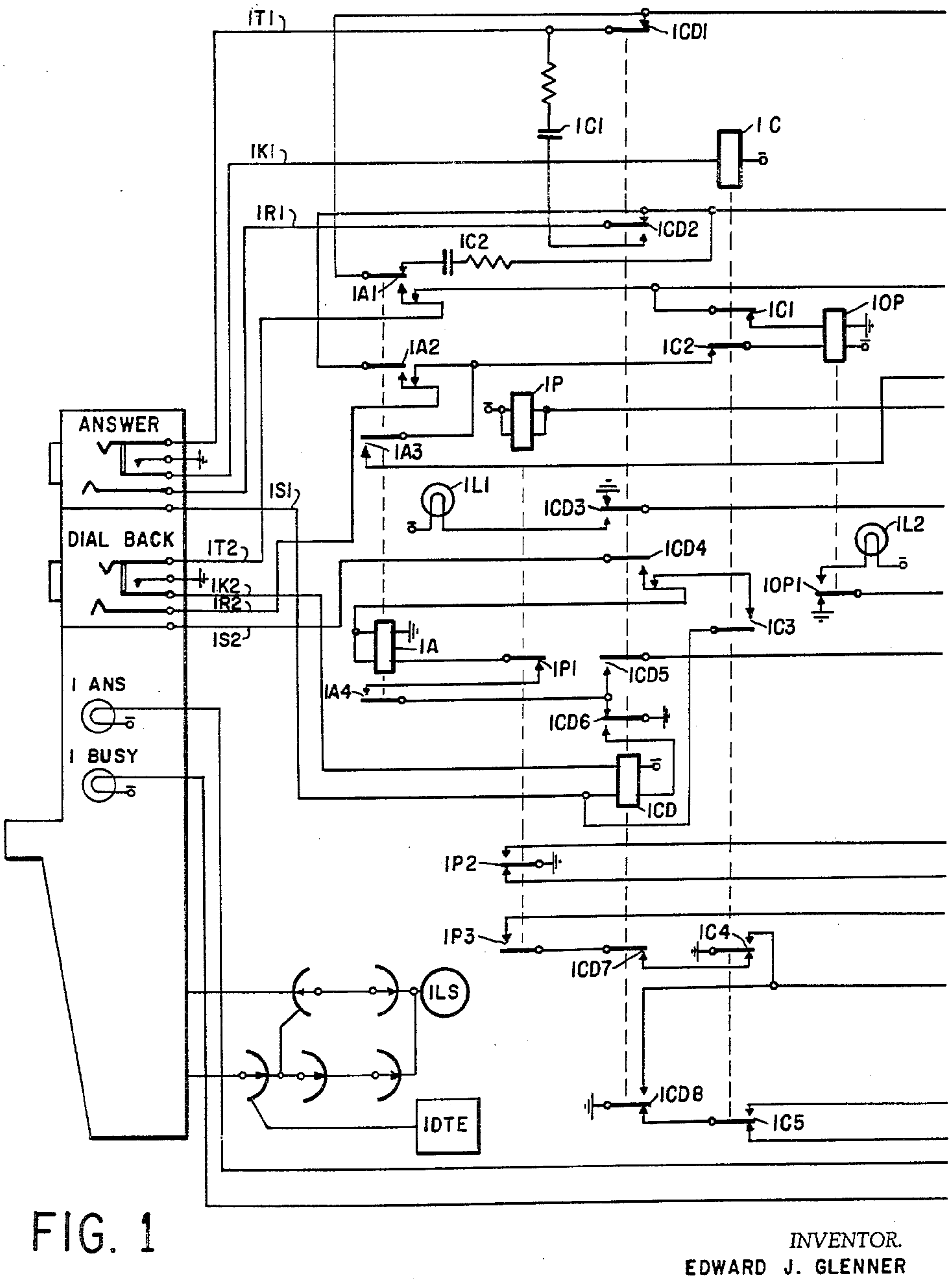
Figure 2:
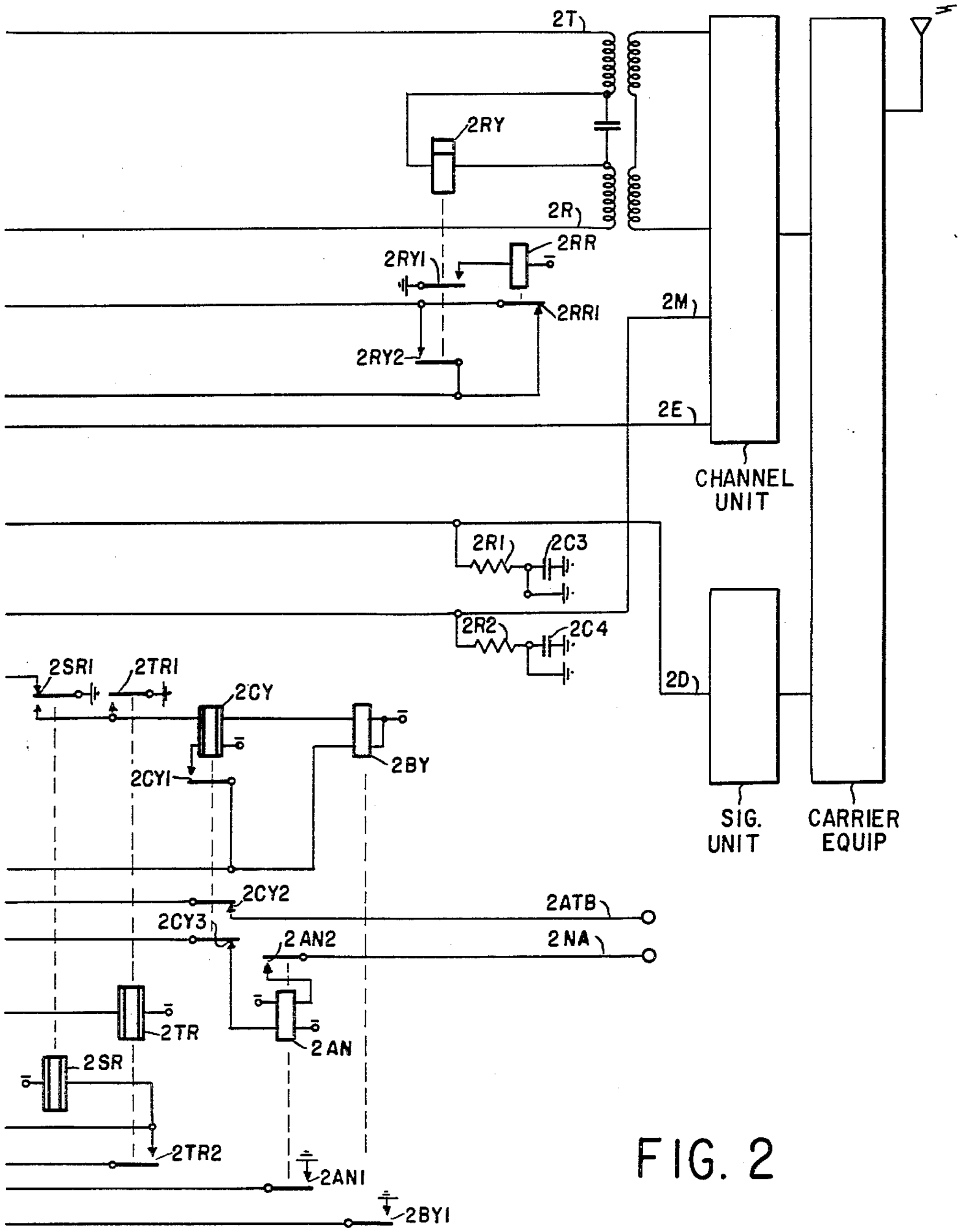
Figure 3:
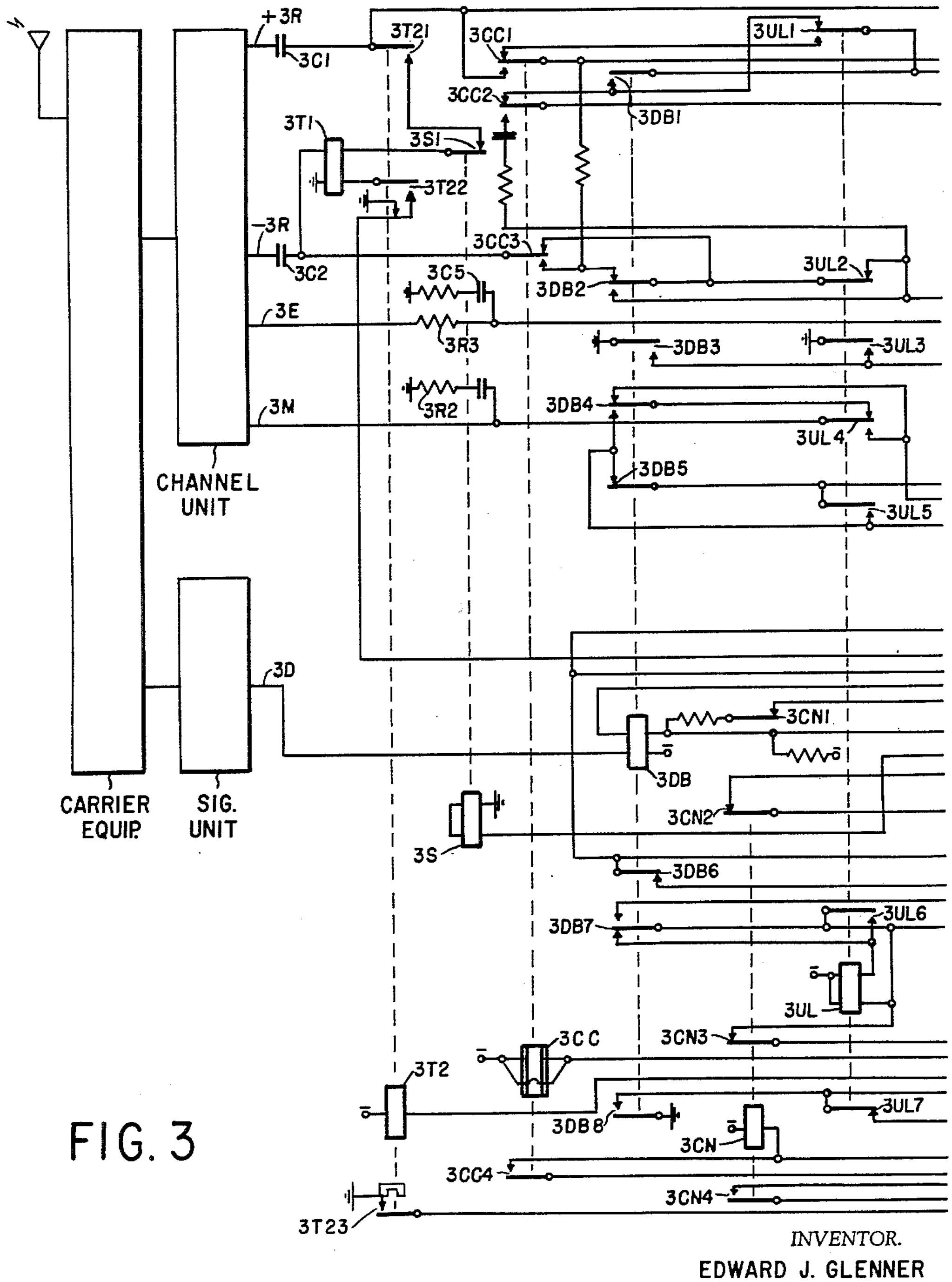
Figure 4:
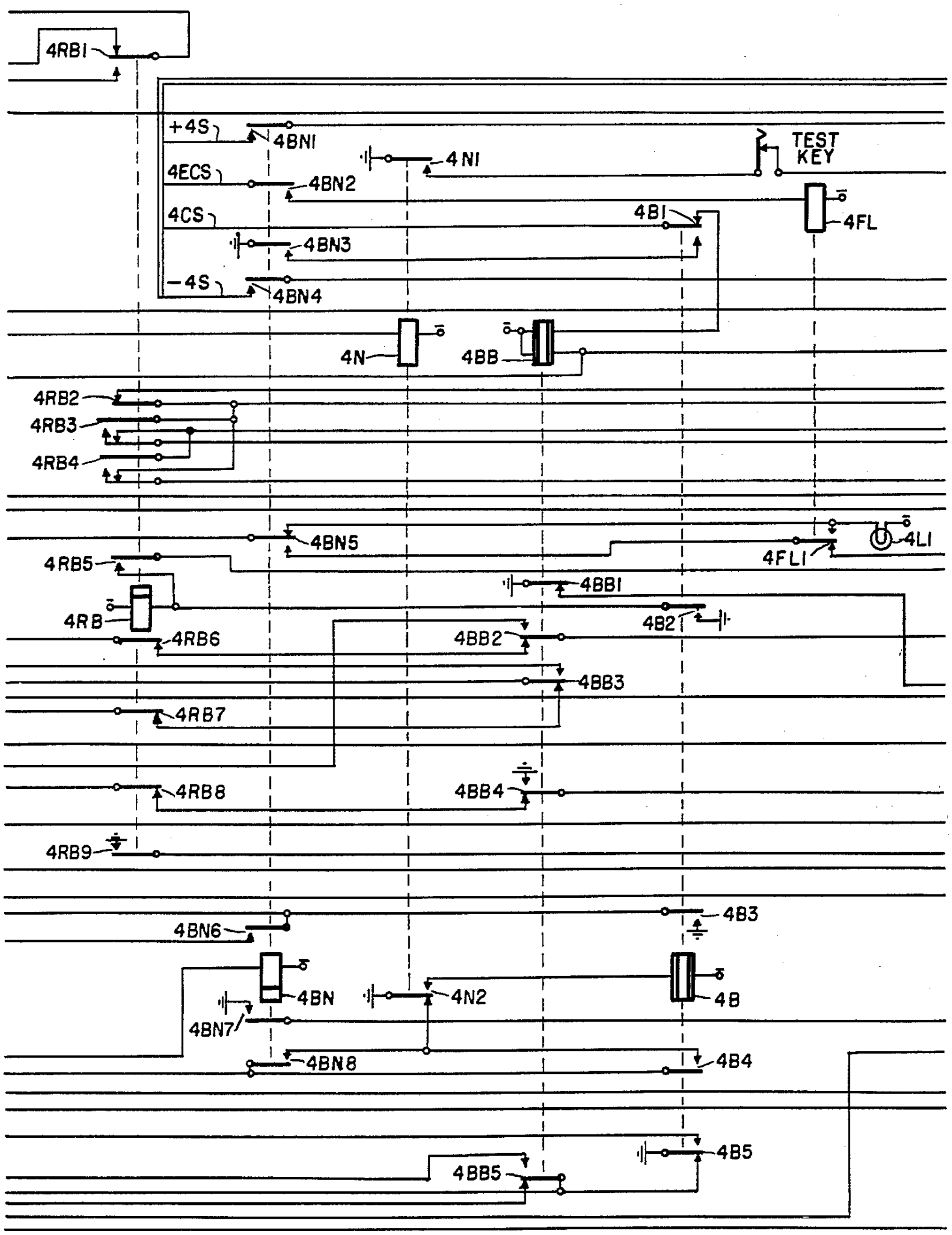
Figure 5:
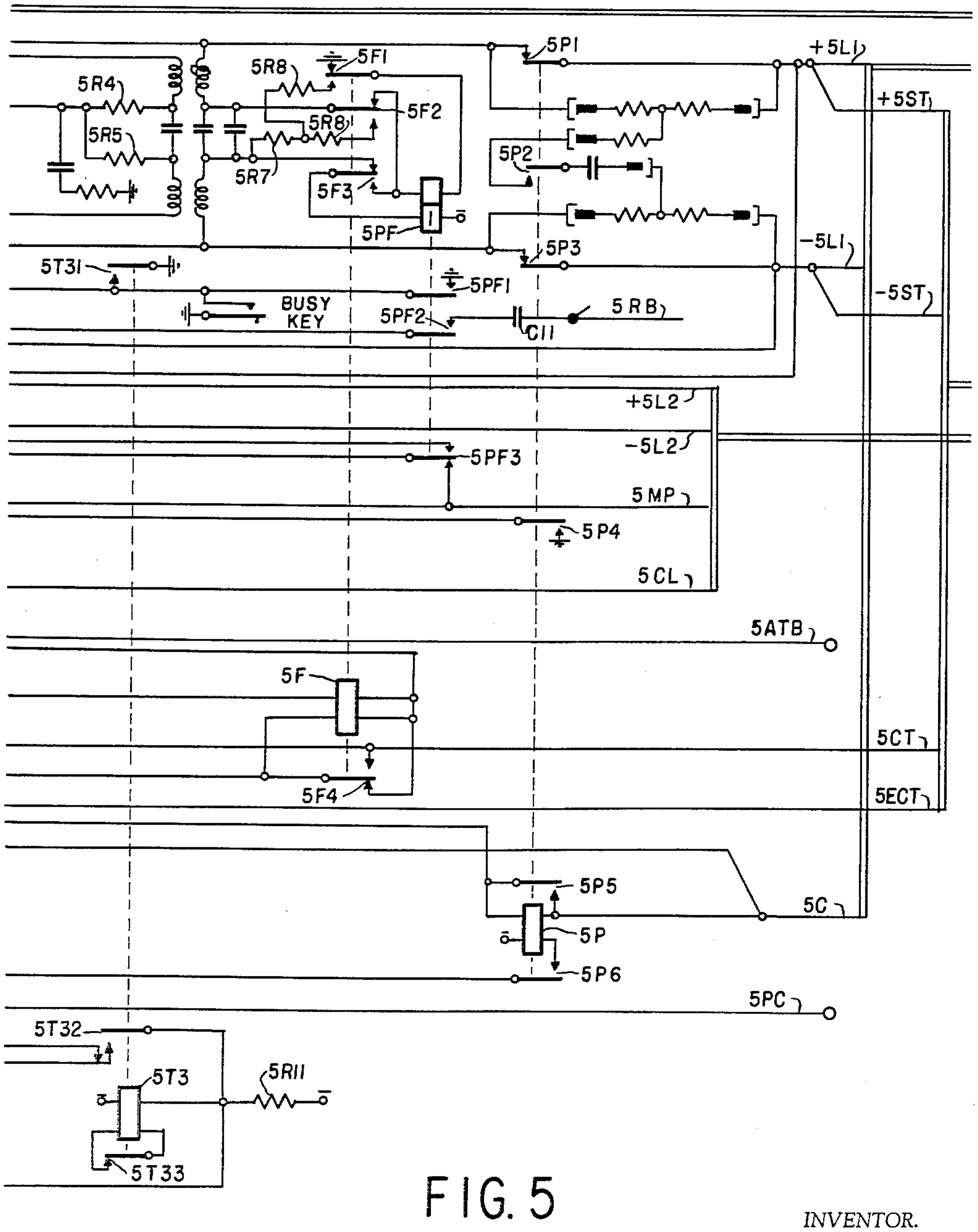
Figure 6:
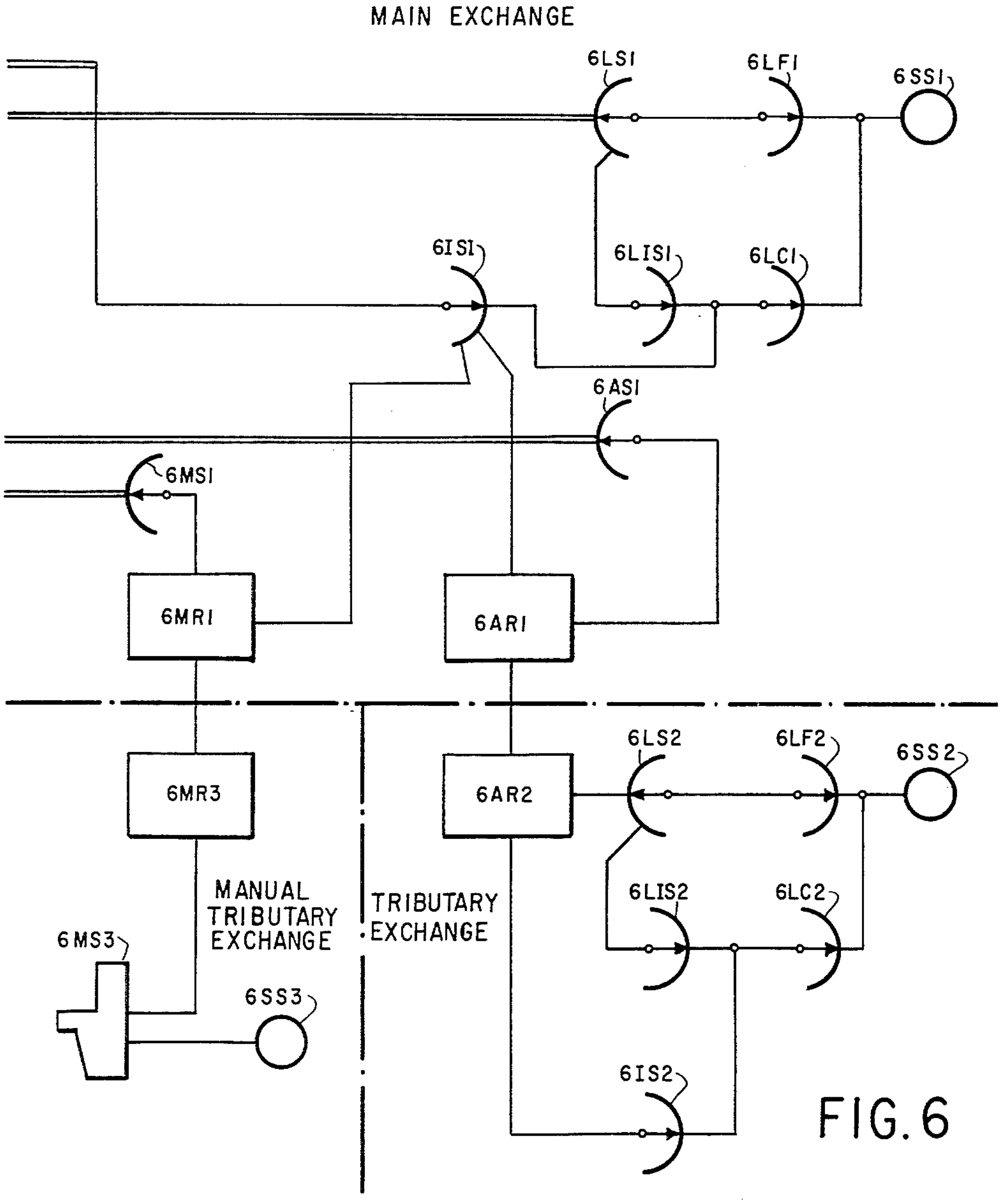
Figure 7:
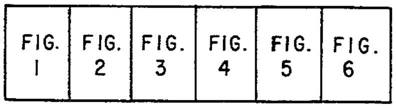

The invention, both as to its organization and method of operation together will best be understood by reference to the following specification taken in connection with the accompanying drawings, in which Figs. 1 and 2 illustrate in schematic form the details of the CLR trunk circuit with dial back service, with a simplified schematic of the local switching equipment in this office and also the carrier equipment terminating the trunk circuit. Figs. 3, 4 and 5 illustrate the details of the repeater circuit located in the main exchange. Also shown in Fig. 3 is the carrier equipment linking this repeater with the operator's exchange. Fig. 6 illustrates in schematic form the switching equipment and a subscriber station of the main exchange as well as of an automatic tributary exchange, and a subscriber and switchboard of a manual tributary exchange. While Fig. 7 illustrates the manner of combining Figs. 1 to 6, inclusive, of the drawings to form a unified system.

These circuits were designed to provide operator service to main exchange and its satellites were there is no operator or toll board in the main exchange. This is accomplished by the operator of the exchange of Figs. 1 and 2 providing the service. She could handle all CLR calls through her manual board, but to reduce the number of trunks that may be used it was decided that she should be able to dial back to the main exchange which has access to nation wide toll lines. Dial back service is not novel, but it had to be expanded from presently known methods to meet all essential signalling and transmission features of nation wide toll dialing. The circuits as shown are linked by carrier equipment requiring a voice transmission channel and three signal channels, though if sufficient physical facilities were available the two circuits could be linked directly to each other. The carrier equipment shown may be of the type disclosed in the Robert S. Caruthers application, Serial No. 382,689, filed September 28, 1953.

The circuit of Figs. 3, 4 and 5 is designed to provide outgoing service from the main office which has access to nation wide toll lines but does not contain a toll board. Person-to-person calls from a subscriber of the main exchange or a tributary of the main exchange can be handled by the remote toll operator. If the call is to be extended through the remote manual office, this circuit functions as an automatic to manual repeater. If the call is destined to be extended through the main exchange to reach the nation wide toll lines the operator at the remote exchange by plugging her front cord into a dial back jack, will condition this repeater circuit for dial back operation; and seize the associated outgoing selector. The operator dials up the connection with the front plug still inserted in the dial back jack, the operators transmission circuit remains connected for monitoring purposes. Front supervision is given to the operator at this time.

At the operators discretion, she removes the plug from the dial back jack and removes her transmission circuit from the connection. The circuit now has less transmission loss than a similar connection would have if two trunks were utilized without a dial back operation.

The operator receives combined supervision of the call on her rear or answer cord. To re-establish her transmission circuit, the front cord is again plugged into the dial back jack.

If the operator makes an error in setting up a dial back call and her position is not equipped with an error key, removal of the rear cord will drop the "dialed back" connection and re-insertion will initiate it again.

Whenever the operator re-enters a dialed back connection, if the calling party was a paystation, the class of service tone will be repeated.

If the call was an extended type and not a dial back call, and the operator wishes to re-check the class of service tone, momentary removal of the rear cord will re-initiate the class of service tone.

These circuits may also be used as out dial trunks if required. To do this, the rear cord should be plugged into the answering jack and the front cord into the "dial back" jack. If the rear cord has been used to answer another call, then a dummy plug may be plugged into the answering jack and the front cord into the dial back jack. Release on error may be accomplished by momentary removal of the dummy plug if error keys are not used.

DETAILED OPERATION

*Seizure from local selector*

When the calling subscriber at station 6SS1 removes his receiver, the usual loop circuit, including the line conductors is completed. In response to the completion of the above mentioned loop circuit, the line circuit initiates operation of the distributor and marks the terminals of the calling subscriber line in the bank contacts of a group of line finders, including the line finder 6LF1, having access to the calling subscriber line. For the purpose of this description it will be assumed that the distributor selects the line finder 6LF1 and that it operates its wiper in a vertical and then in a rotary direction in the well known manner to select the terminals in the associated bank terminating the calling line. When the calling line is found by the line finder 6LF1, it extends the calling line to the individually associated first selector 6LS1 and the latter selector transmits the usual dial tone signal to the calling subscriber to indicate that the dialing may be started. The above noted switching apparatus, including the line circuit, the distributor, the line finder and the first selector may be of conventional construction and arrangement and may be, for example, of the type illustrated in the Bakker Patent No. 2,289,896, granted July 14, 1942 and in the Saunders Patent No. 1,849,694, granted March 15, 1932.

To extend the connection to the repeater circuit, it is now necessary for the subscriber to dial the digit "0." Consequently, when the calling subscriber received the dialing tone signal the dial is to be actuated in accordance with the digit 0 to transmit ten loop impulses to the first selector 6LS1. This selector then raises its wipers in a vertical direction to the tenth level and then rotates its wipers over the selected level to search for an idle repeater circuit, such as the repeater circuit of Figs. 3, 4 and 5. It will be assumed for the purpose of this description that the first selector now extends the connection from the calling subscriber line to the repeater circuit. The conductors include the "−" conductor −5L1, the "+" conductor +5L1 and the control conductor 5C. If the repeater circuit is busy, the control conductor will be grounded in order to indicate the busy condition to the first selector. Thus, as the selector rotates its wipers over the tenth level it will pass over contacts terminating trunk circuits having grounded control conductors corresponding to the 5C conductor.

THROUGH CALLS

*Seizure from local selector loop access*

Resistance battery through resistor 3R9 on lead 5C marks this circuit idle to the preceding local switch equipment. When seized, a loop is closed over leads +L1 and −L1. Relay 5PF operates, closes battery through lamp 4L1 from L1 to lead 3M, closes ring-back tone from lead 5RB to lead −L1, and closes ground to the number one winding of relay 4BB. Relay 4BB operates, removes resistance battery from control leads 5C, 5CL and 5CT, closes ground to local selector lead 5C, and also leads 5CL and 5CT which marks this circuit busy to preceding equipment, and closes a circuit to relay 3CN. Relay 3CN operates and prepares a circuit to lead 5CP.

*Seizure from intertoll selector*

Resistance battery through resistor 3R9 in series with the number one winding of relay 5F and the number two winding of relay 3DB on lead 5CT marks this circuit idle to the preceding equipment. When seized, ground is closed through lead 5CT to the number one winding of relay 5F. Relay 5F operates its X contacts 5F4, opens the short circuit to its number two winding and locks to the ground on lead 5CT. Relay 5F operates fully with both windings in series the number one and the number two windings of relay 5PF in series to leads +5ST and −5ST through resistances 5R6, 5RT and 5R8 and the repeater coil 5RC. Ground is closed to leads +5ST and −5ST. Relays 5PF, 4BB, and 3CN operate as explained in the section "Seizure from local selector" except that the operation of relay 4BB closes a locking ground to relay 5F.

*Seizure from tributary selector*

Resistance battery through resistors 3R9 and 3R10 in series on lead 5CL marks this circuit idle to preceding equipment. When seized, a loop is closed over leads +L2 and −L2. Relays 5PF, 4BB and 3CN operate as explained in the section on "Seizure from local selector." Upon the operation of 4BB, ground through relay 3S and make contacts 4BB2 is closed to relay 5CL. Relay 3S operates and further opens the number two winding of relay 3T1 which prevents class of service tone from being sent to the operator on calls from the tributary selector.

*Operator answers*

When the operator answers, ground is closed to lead 3E. Relay 4N operates, and closes ground to relay 4B, and prepares to close a ground to leads +4S and −4S. Relay 4B operates, closes ground through relays 4RB and 3T2, prepares a circuit to relay 3UL and opens the circuit to 3CN. Relay 3CN restores and prepares the circuit to 4BN. Relay 4RB operates reverses leads +5L2 and −5L2 to give reverse battery supervision and removes the ring-back tone from the line leads. Relay 3T2 operates, transfers the supervisory lead from direct ground at contact 3T22 to ground through the number one winding of relay 3T1, closes a circuit to the number two winding of relay 3T1 to leads −3R and +3R, and sets its weighted spring in motion to alternately close and open the circuit to relay 5T3.

If class of service tone is used, a tone is closed through the supervisory lead to the number one winding of relay 3T1, then by induction through the number two winding of relay 3T1 through capacitors 3C1 and 3C2 through leads −3R and +3R. Relay 5T3 is slow-to-operate due to its short circuit number one winding, and does not operate on the intermittent ground supplied by relay 3T2. When the weighted spring of relay 3T2 comes to rest, relay 5T3 operates, locks, opens the short circuit to its number one winding, opens the circuit to relay 3T2, closes locking ground to relay 4BB, opens the short circuit to the number one winding of relay 5P and prepares the holding ground to relay 5P. Relay 5T2 restores and disconnects the number two winding of relay 3T1, transfers the supervisory lead from the number one winding of relay 3T1 to direct ground and opens the circuit to the number two winding of relay 5T3. Relay 5P operates, closes its X contacts 5P6 and locks, operates fully, short circuits its number one winding and removes the short circuits from the pads.

*Checking of class of service tone*

If the operator wants to check the class of service tone, ground is momentarily removed from lead 3E. Relay 4N restores, opens the circuit to relay 4B, and closes the circuit to relay 3C. Relay 3C operates, transfers capacitors 3C1 and 3C2 from the incoming line leads to resistor 3R1, and transfers incoming leads from capacitors from 3C1 and 3C2 to capacitors 3C3 and the resistor in series. Relay 4B restores, closes the circuit to relay 3CM, opens the circuit to relay 3C, and opens the circuit to relay 5T3. Relay 3CN operates. Relay 5T3 restores, short circuits its number one winding, opens the number two winding of relay 5P and prepares the circuit to relay 3T2. Relay 3C restores and restores the incoming and outgoing leads to their former state.

When ground is again closed to lead 3E, relay 4N operates and closes a circuit to relay 4B. Relay 4B operates, opens the circuit to relay 3CN, and closes a circuit to relay 3T2. Relay 3CN restores. Relays 3T2, 5T3 and 5P operate as explained. Calls of service tone is closed to the —3R and +3R leads. Relay 3T2 restores. Relay P operates as explained in the section entitled "Operator answers."

*Release, calling party disconnects first*

When the calling party disconnects, ground is removed from leads +L1 and —L1. Relay 5PF restores and transfers lead 3M from battery through lamp 4L1 to ground. The operator receives release supervision. When the operator releases, ground is removed from lead 3E. Relay 4N restores, opens the circuit to relay 4B and closes a circuit to relay 3C. Relay 3C operates as explained in the preceding section. Relay 4B restores after its slow-to-release interval, opens the circuit to relay 3C and relay 5T3, closes the circuit to relay 3CN, and opens the operating path to relay 4BB. Relay 3CN operates. Relay 3C restores as explained in the preceding section. Relay 5T3 restores, opens the circuit to the number two winding of relay 5P, short circuits the number one winding of relay 5P, and opens the circuit to relay 4BB. Relay 5P restores and short circuits the pads. Relay 4BB restores, opens the circuit to relay 4RB, closes ground potential to lead 5ATB, opens the circuit to relay 3CN, and opens the circuit to both number one and number two windings to relay 5F. Relay 5F restores and transfers the number one and the number two windings of relay 5PF to the loop access condition. Relay 3S restores. Relay 4RB restores and restores leads +L1 and —L1 to their non-reversed state. Relay 3CN restores. This circuit is now at normal.

*Release, operator releases first*

When the operator releases, ground is removed from lead 3E. Relay 4N restores, opens the circuit to relay 4B and closes a circuit to relay 3C. Relays 3C and 3CN operate as explained in the penultimate section. Relays 5T3, 5P and 3C restore as explained in the preceding section. When the calling party releases, relays 5PF, 4BB, 3CN, 5F, 3S, and 4RB restore as explained in the preceding section. The circuit is now at normal.

DIAL-BACK CALLS

*Seizure*

This circuit is seized as explained in the section entitled "Seizure from local selector."

*Operator answers*

When the operator answers, this circuit operates as explained in the section entitled "Seizure from intertoll selector." If the call is a dial-back call, ground is closed to lead 3D. Relay 3DB operates, closes a ground to relay 4BN, opens the short circuit to the number one winding of relay 5P, closes a multiple path to leads +L1 and —L1, closes multiple locking ground to relay 4BB, and removes battery through lamp 4L1 from lead 3M. Relay 4BN operates, closes ground potential to lead 4CS, closes a circuit to relay 4FL to lead 4ECS, closes leads +4S and —4S to the repeating coil 5RC, and prepares a circuit to lead 3M. Relay 5P operates as explained in the preceding section entitled "Operator answers."

When the operator dials, the pulses are repeated to lead 3E as removals of ground potential. Relay 4N follows the pulses, repeats them as ground pulses to leads +4S and —4S. When relay 4N restores during the first pulses, ground is closed to relay 3C and opened from relay 4B. Relay 4B does not restore during pulsing due to its slow-to-release characteristics. Relay 3C operates, prepares a circuit to relay 3CN, opens the leads +L1 and —L1 from leads +3R and —3R, closes resistor 3R1 across leads +3R and —3R and closes resistor and capacitor 3C in series across leads +L1 and —L1 respectively. Relay 3C stays operated through pulsing due to its slow-to-release characteristics. Relay 3C restores after each series of pulses and restores leads +3R, —3R, +L1 and —L1 to their normal state. After pulsing is completed, relay 3C restores.

When the calling party answers, ground is closed to lead 4ECS. Relay 4FL operates and closes battery through lamp 4L1 to lead 3M.

When the connection is completed, ground is removed from lead 3D. Relay 3DB restores, closes a circuit to relay 3UL, and closes multiple paths to leads +L1 and —L1. Relay 3UL operates, locks, opens the circuit to relay 5T3, opens lead +L1 and —L1 from leads +3R and —3R and closes resistor 3R1 across the leads +3R and —3R. Relay 5T3 restores, short circuits its number one winding, opens the number two winding of relay 5P. If the operator makes an error during dialing and wants to re-dial, ground is removed momentarily from lead 3E. Relay 4N restores, opens ground to leads +4S and —4S to release the outgoing selector, opens a circuit to relay 4B and closes the circuit to relay 3C. Relay 3C operates. Relay 4B restores, opens the circuit to relays 4BN and 3UL, opens ground to lead 4CS, closes the circuit to relay 3CN, and opens the circuit to relay 3C. Relay 3C restores as previously explained.

When ground is again closed to lead 3E, lead 4N operates and the circuit is again seized as explained. If the operator wants to re-enter the connection, ground is closed to lead 3D. Relay 3DB operates, connects the multiple path to leads +3R and —3R, opens the resistor to 3R1 from leads +3R and —3R, and closes a ground to relay 3T2. Relays 3T2 and 5T3 operate as explained in the preceding section entitled "Operator answers."

*Stop-dial*

Stop-dial supervision is received as ground potential on lead 4ECS. Relay 4FL operates, closes battery through lamp 4L1 to lead 3M and removes ground from lead 3M. When dialing may continue, ground on lead 4ECS is removed. Relay 4FL restores, opens battery through lamp 4L1 from lead 3N, and closes ground to lead 3M.

*Release, calling party restores first*

When the calling party restores, the ground is removed from leads +L1 and —L1. Relay 5PF restores and opens battery through lamp 4L1 from lead 3M. When the operator restores, ground is removed from lead 3E. Relay 4N restores, opens the circuit to relay 4B, removes ground from leads +4S and —4S and closes a circuit to relay 3C. Relay 3C operates as explained in the preceding penultimate section. Relay 4B, 4BB, 4RB and possibly 5P and 5F restore and relay 3CN operates as explained for a through call. The path to relays 3UL and 4BN is opened when relay 4B restores. Relays 3UL and 3BN restore. The path to relay 4FL is opened when relay 4BN restores. Relay 4FL restores. This circuit is now at normal.

*Release, called party restores first*

When the called party restores, ground is removed from lead 4ECS. Relay 4FL restores and removes battery through lamp 4L1 from lead 3M and closes ground to lead 3M to give release supervision. When the operator restores, ground is removed from lead E. Relay 4N restores. Relays 3C and 3CN operate as explained for a through call. Relays 5PF and 4BB, 4B, 4RB, 3C, 4CN and possibly 5F and 5P restore as previously explained. Relays 4BN and 3UL restore as explained in the preceding section. This circuit is now at normal.

*Release, operator releases first*

When the operator restores, ground is removed from lead 3E. Relays 3C and 3CN operate as explained in the penultimate preceding section. Relays 4N, 4B, 4RB, 4BB, 5PF, 3C and 3CN restore as explained in an earlier section entitled "Operator releases." Relays 4BN, 3UL, and 4FL restore as explained in the section entitled "When the calling party releases." This circuit is now at normal.

INCOMING CALLS

*Seizure*

The circuit to relay 1P will be completed over lead 2E. Relay 1P operates, and completes a circuit to relay 2BY from the make contacts from its armature spring 1P2 and removes ground from the all-trunks-busy lead 2ATB at the break springs of armature spring 1P2, and closes a circuit to relay 2AN at make contacts 1P3. Relay 2BY operates and at its contacts 2BY1 completes a circuit to light the busy lamp 1 BUSY. Relay 2AN operates and extends resistance battery to lead 2NA, and at its contacts 2AN1 completes a circuit to light the answer lamp 1ANS.

*Operator answers*

To answer an incoming call, the toll operator plugs the rear cord into the answer jack thus forwarding resistance battery over lead 1S1 ground to lead 1K1 to complete a circuit to 1C, and closes its transmission path from the operator to the calling party. Relay 1C operates and opens the circuit to relay 2AN, and closes circuits to relays 1A, 2SR and 2TR. Relay 2AN restores, and extinguishes the answer lamp and opens the lead 2NA. Relay 1A operates, connects lead 1T2 and 1R2 to leads 2T and 2R respectively, removes the idle line termination from leads 2T and 2R, disconnects leads 1T2 and 1R2 from relay 1OP, and closes at contacts 1A3 the operating circuit for relay 1OP. Relay 2SR operates, closes a circuit to relay 2CY and locks relay 2BY in series. Relay 2TR operates. Relay 1OP operates and changes the trunk signal lead 2M from its "normal" to its "seized" state. Relay 2CY operates and locks.

*The extension of the call under normal operation*

When the toll operator extends the call using normal procedures supervision is replaced over sleeve lead 1S1. To check the class of service tone the operator has only to momentarily remove the cord.

*Extending the call using dial-back operation*

When the toll operator plugs the front cord into the dial-back jack resistance battery is closed to lead 1K2. Relay 1CD operates from the ground to lead 1K2, and transfers leads 1T1 and 1R1 from leads 2T and 2R of the idle line termination composed of capacitor 1C2 and the associated resistor. Transfers relay 1A from sleeve lead 1S1 to sleeve lead 1S2, and opens the number one winding of relay 1A at its break contacts 1CD6 and closes ground from its make contacts 1CD6 from its own number 2 winding to sleeve lead 1S1, changes lead 2D from its "normal" (ground) to its "seized" state (battery), and opens the circuit to relay 2SR at its break contacts 1CD8. The distant office equipment changes lead 2E from its "seized" to its "normal" state. Relay 1P restores. Relay 2SR restores and closes low resistance ground to sleeve lead 1S2 to light the front supervisory lamp.

When the operator dials back the sleeve lead 1S2 is open. Relay 1A closes the loop pulse over leads 1T2 and 1R2 to relay 1OP. Relay 1OP follows these dial pulses and repeats them over lead 2M. At the end of dialing, sleeve lead 1S2 is reclosed. Relay 1A reoperates.

When the called party answers the distant equipment changes lead 2E from its "normal" to its "seized" state. Relay 1P operates and removes ground from the number one winding of relay 1A to extinguish the front cord supervisory lamp.

When the parties are connected, the operator moves the front cord, opening the circuit to relay 1CD. Relay 1CD restores, closes leads 1T1 and 1R1 and leads 2T and 2R, moves the idle line termination from leads 1T1 and 1R1, closes relay 1A and sleeve lead 1S1, changes lead 2D from its "seized" to its "normal" state, and closes ground to relay 2SR. Relay 2SR operates. Combined supervision is maintained on the rear cord lamp from lead 1S1.

If the toll operator makes an error in setting up a dial-back call and the position is not equipped with an error key removel of the rear cord "dial-back" connection and reinsertion will initiate it again.

Whenever an operator re-enters a "dial-back" connection, if the calling party was a paystation the class of service tone will be repeated for approximately two seconds.

*Release*

When the distant operator disconnects lead 2E is changed from its "seiged" to its "normal" state. Relay 1P restores and closes ground from the number one winding of relay 1A to sleeve lead 1S1 to light the toll operator's supervisory lamp.

When the toll operator disconnects the circuit is open to relays 1C and 1A. Relay 1A restores, closes the idle line termination to leads 2T and 2R, and opens the circuit to relay 1OP. Relay 1OP restores and changes trunk signal lead 2N from its "seized" state to its "normal" state. Relay 1C restores and opens the circuit to relay 2TR. Relay 2TR restores and opens the circuit to 2SR. Relay 2SR restores and opens the circuit to relays 2CY and 2BY. Relay 2CY restores and places ground on lead 2ATB. Relay 2BY restores and extinguishes the busy lamp.

OUTGOING CALLS

*Seizure*

If the toll operator wishes to dial out over this trunk circuit the rear cord is placed into the answer jack and the front cord into the dial-back jack.

The operator plugs the rear cord into the answer jack thus places resistance battery on lead 1S1 and ground on lead 1K1. Relay 1C operates and closes circuits of relays 1A, 2TR and 2SR. Relay 1A operates, connects leads 1T2 and 1R2 to leads 2T and 2R respectively, closes ground from the number one winding of relay 1A to sleeve lead 1S1 to light the rear cord supervisory lamp and removes the idle line termination from leads 2T and 2R. Relay 2TR operates and closes the circuit to the number one winding of relay 2CY and the number one winding of relay 2BY in series. Relay 2SR operates. Relay 1OP operates and changes trunk signal lead 2M from its "normal" to its "seized" state. Relay 2CY operates and removes ground from lead 2ATB. Relay 2BY operates and lights busy lamp.

*Dialing*

The operator now plugs the front cord into the dial-back jack. Ground over lead 1K2 completes a circuit to relay 1CD. Relay CD operates and transfers leads 1T1 and 1R1 from leads 2T and 2R to the idle line termination, holds sleeve leads 1S2, closes ground from the number two winding of relay 1CD to the sleeve lead 1S1, changes lead 2D from its "normal" to its "seized" state and opens the circuit to relay 2SR. Relay 2SR restores and closes ground through the number one winding of relay 1A to the sleeve lead 1S2 to light the front cord supervisory lamp.

As the dial is rotated "off-normal," sleeve lead 1S2 is opened. Relay 1A restores and switches leads 1T2 and 1R2 to relay 1OP. Relay 1OP follows the dial pulses and repeats them over lead 2M. After dialing sleeve lead 1S2 is reclosed. Relay 1A reoperates and transfers leads 2T and 2R from the idle line termination to leads 1T2 and 1R2, respectively.

*Called party answers*

When the called party answers, lead 2E is changed from its "normal" to its "seized" state. Relay 1P operates and opens the circuit to the number one winding of relay 1A to extinguish the front cord supervisory lamp. Conversation may now take place. If the rear cord had been used to answer another call then the operator may insert a dummy plug into the answer jack. Relay 1C will operate and the circuit will function as explained.

*Release*

When the distant party disconnects lead 2E is opened. Relay 1P restores and closes the circuit to the number one winding of relay 1A to light the front cord supervisory lamp.

The toll operator removes the front cord. Relay 1CD restores, transfer leads 1T1 and 1R1 from the idle line termination to leads 2T and 2R, respectively, transfers relay 1A from lead 1S2 to lead 1S1, changes lead 2D from its "seized" to its "normal" state, and closes ground to relay 2SR. Relay 2SR operates.

The toll operator now removes the rear cord. Relay 1A restores, closes the idle line termination to leads 2T and 2R and opens the circuit to relay 1OP. Relay 1OP restores and changes trunk signal lead 2M from its "seized" to its "normal" state. Relay 1C restores and opens the circuit to relay 2TR. Relay 2TR restores and opens the circuit to relay 2SR. Relay 2SR restores and opens the circuits of relays 2CY and 2BY. Relay 2CY restores and closes ground to lead 2ATB. Relay 2BY restores and extinguishes busy lamp 1 BUSY. The circuit is now at normal.

*Ring control*

When the operator closes the ring key, ground and 100 ohm battery are closed to leads 2T and 2R, respectively. Relay 2R operates and closes ground to relay 2RR. Relay 2RR operates. When the ring key is restored, ground and 100 ohm battery are removed from leads 2T and 2R. Relay 2R restores, opens the circuit of relay 2RR and opens the circuit to relay 1OP. Relay 2RR is slow-to-release and holds momentarily. Relay 1OP restores and changes trunk signal to lead 2M from its "seized" to its "normal" state. After a slight delay, relay 2RR restores and closes the circuit to relay 1OP. Relay 1OP reoperates and changes trunk signal lead 2M from its "normal" to its "seized" state. This momentary change in trunk signal lead 2M causes the distant office equipment to initiate a signal.

*Recall*

If the distant office wishes to call the operator, lead 2E is opened momentarily. Relay 1P operates momentarily and closes ground through the number one winding of relay 1A to sleeve lead 1S1 or 1S2 to light the respective cord supervisory lamp.

Although one specific embodiment of the invention has been shown and described, it should be understood it is merely illustrated and that various modifications may be made therein without departing from the scope and spirit of the invention as defined in the appended claims.

What is claimed is:

1. In a telephone system, a first, second and third exchange, an operator's switchboard in said first exchange, switching equipment in said second and third exchanges, a calling line in said second exchange and a called line in said third exchange, a first trunk line connecting said second and third exchanges, carrier equipment in said first and third exchanges comprising a carrier trunk path connecting said first and third exchanges and terminating at a trunk circuit in said first exchange and a repeater circuit in said third exchange, means including said switching equipment in said second exchange responsive to the initiation of a call by said calling line from said second exchange to said third exchange over said trunk line to complete an operative connection to said repeater circuit in said third exchange, means in said repeater circuit effective upon said calling line's operative connection to said repeater to condition said trunk circuit via said carrier path to signal said operator position, said trunk circuit effective upon operator answering said call to condition said repeater to signal said second exchange of this completed connection by reversing battery thereto, said repeater in said third exchange conditioned to seize a switch of said switching equipment upon said operator's answering said calling subscriber, said repeater thereafter effective to repeat dial pulses from said operator's position to said switching equipment of said third exchange to complete a connection to said called line, means in said repeater and trunk circuit controlled by either calling or called line when the subscriber replaces his receiver to signal the operator of said condition.

2. In a telephone system, a first exchange, an operator's switchboard including an answer lamp, a busy lamp, an answer jack, and a dial-back jack for terminating said trunk circuit, a trunk circuit connected to said switchboard, carrier equipment terminating said trunk circuit, a second exchange, carrier equipment, a dial-back repeater connecting to said carrier equipment, switching equipment in said second exchange including a first and a second selector, a calling line at said second exchange, and means comprising said first selector for accessing said repeater to said carrier equipment, a third exchange, a two-way trunk line extending from said second exchange and terminating in said third exchange, said trunk line accessible from said second selector switch, means in said repeater of said second exchange responsive to the initiating from said calling line for momentarily applying a first potential to a signal lead to said carrier equipment, said carrier equipment of said second exchange causing said carrier equipment of said first exchange to signal said trunk circuit, said trunk circuit causing an answer and a busy lamp at said operator's position to light, said operator answering said calling line by plugging the rear cord into the answer jack, said trunk circuit in response to said operator's answer causing the application of a first potential to a second signal lead to said carrier equipment thereby completing a transmission path through said carrier equipment, said carrier equipment of said second exchange in response to said signal to said carrier equipment of said first exchange causing a signal to be impressed upon a second signal lead to said repeater circuit, said repeater circuit marking itself busy to said switching equipment of said second exchange, said operator upon obtaining the required information orally from said calling line then plugging her front cord into the dial-back jack, said trunk circuit in response thereto places a first potential upon a third signal lead to said carrier of said first exchange, said carrier equipment of said second exchange in response to said carrier equipment of said first exchange causing a second potential to be applied to a third signal lead to said repeater circuit, said repeater circuit in response removing said first potential from said first lead to said carrier equipment and also seizes said second selector, when the operator dials the desired number, this information is forwarded from said trunk circuit as a series of pulses to said second signal lead to said carrier equipment, at said second exchange these pulses are repeated to the repeater circuit to the selector through which they are extended to said third exchange, when said called party answers said repeater circuit again imposing a first potential to said first signal lead to said carrier equipment, at said first exchange the first signal lead is again marked causing said trunk circuit to extinguish the front cord supervisory lamp, the operator thereupon removes her front cord from the dial-back jack thereby removing her transmission circuit thereby decreasing the transmission loss while maintaining complete supervision on the answer cord.

3. In a telephone system, a first exchange, an operator's switchboard including an answer lamp, a busy lamp, an answer jack, and a dial-back jack for terminating said trunk circuit, a trunk circuit connected to said switchboard, carrier equipment terminating said trunk circuit, a second exchange, carrier equipment, a dial-back repeater connecting to said carrier equipment, switching equipment in said second exchange including a first and a second selector, a calling line at said second exchange, and means comprising said first selector for accessing said repeater to said carrier equipment, a toll line accessible from said second exchange, said toll line accessible from said second selector switch, means in said repeater of said second exchange responsive to the initiating from said calling line for momentarily applying a first potential to a signal lead to said carrier equipment, said carrier equipment of said second exchange causing said carrier equipment of said first exchange to signal said trunk circuit, said trunk circuit causing an answer and a busy lamp at said operator's position to light, said operator answering said calling line by plugging the rear cord into the answer jack, in response said trunk circuit applying a first potential to a second signal lead to said carrier equipment and completing a transmission path through said carrier equipment, said carrier equipment of said second exchange in response to said signal to said carrier equipment of said first exchange causing a signal to be impressed upon a second signal lead to said repeater circuit, said repeater circuit marking itself busy to said switching equipment of said second exchange, said operator upon obtaining the required information orally from said calling line then plugging her front cord into the dial-back jack, said trunk circuit in response thereto places a first potential upon a third signal lead to said carrier equipment of said first exchange, said carrier equipment of said second exchange in response to said carrier equipment of said first exchange causing a second potential to be applied to a third signal lead to said repeater circuit, said repeater circuit in response removing said first potential from said first lead to said carrier equipment and also seizes said second selector, when the operator dials the desired number, this information is forwarded from said trunk circuit as a series of pulses to said second signal lead to said carrier equipment, at said second exchange these pulses are repeated to the repeater circuit to the selector through which they are extended to said toll line, when said called party answers said repeater circuit again imposing a first potential to said first signal lead to said carrier equipment, at said first exchange the first signal lead is again marked causing said trunk circuit to extinguish the front cord supervisory lamp, the operator thereupon removes her front cord from the dial-back jack thereby removing her transmission circuit thus decreasing the transmission loss while maintaining complete supervision on the answer cord.

4. In a telephone system, a first exchange, an operators switchboard including an answer lamp, a busy lamp, an answer jack, and a dial-back jack, a trunk circuit connected to said switchboard carrier equipment terminating said trunk circuit, a second exchange, carrier equipment, a dial-back repeater connecting to said carrier equipment, switching equipment in said second exchange including a first and a second selector, a calling line at said second exchange, and means comprising said first selector for accessing said repeater to said carrier equipment, a toll line accessible from said second exchange, said toll line accessible from said second selector switch, means in said repeater of said second exchange responsive to the initiation of a call from said calling line for momentarily applying a first potential to a first signal lead to said carrier equipment, said carrier equipment of said second exchange causing said carrier equipment of said first exchange to signal said trunk circuit, said trunk circuit causing an answer and a busy lamp at said operator's position to light, said operator answering said calling line by plugging the rear cord into the answer jack, in response said trunk circuit applying a first potential to a second signal lead to said carrier equipment and completing a transmission path through said carrier equipment, said carrier equipment of said second exchange in response to said signal to said carrier equipment of said first exchange causing a signal to be impressed upon a second signal lead to said repeater circuit, said repeater circuit marking itself busy to said switching equipment of said second exchange, said operator upon obtaining the required information orally from said calling line then plugging her front cord into the dial-back jack, said trunk circuit in response thereto places a first potential upon a third signal lead to said carrier equipment of said first exchange, said carrier equipment of said second exchange in response to said carrier equipment of said first exchange causing a second potential to be applied to a third signal lead to said repeater circuit, said repeater circuit in response removing said first potential from said first lead to said carrier equipment and also seizing said second selector, when the operator dials the desired number, this information is forwarded from said trunk circuit as a series of pulses to said second signal lead to said carrier equipment, at said second exchange these pulses are repeated thru the repeater circuit to the second selector through which they are extended to said toll line, said repeater in response to a stop-dial signal from said toll line forwards this information to said operator as on application of a first potential to said first signal lead to said carrier equipment, said first potential to said first signal lead removed when the stop-dial condition is removed to signal the operator to continue the dialing operation when said called party answers said repeater circuit again imposing a first potential to said first signal lead to said carrier equipment, at said first exchange the first signal lead is again marked causing said trunk circuit to extinguish the front cord supervisory lamp, the operator thereupon removes her front cord from the dial-back jack thereby removing her transmission circuit thus decreasing the transmission loss while maintaining complete supervision on the answer cord.

5. In a telephone system including a first and a second exchange, an operator's position in said first exchange, a trunk circuit connected to said operator's position, a repeater circuit in said second exchange, a transmission and a plurality of signalling channels connecting said trunk circuit and said repeater circuit characterized by means in said trunk circuit responsive to a first potential applied to a first one of said signal channels to signal the operator of a waiting call and a second means in said repeater responsive to the application of a first potential to a second of said signal channels to condition said repeater to complete a transmission path from a calling subscriber to the operator and a third means in said repeater responsive to said operator preparing to dial into said called exchange to impress a second potential upon a third of said signal channels to condition said repeater to seize a selector for extending a call to a called subscriber.

6. In a telephone system as claimed in claim 5, a fourth means in said repeater responsive to the dial pulsing by said operator received as removals of potential from said second signal channel to pulse said selector, a fifth means in said repeater responsive to said operator conditioning said repeater for the receiving of the dial-pulses to cause said repeater to remove said first potential from said first signal channel, said first signal channel thereafter effective to signal said operator of the called party answer condition.

7. In a telephone system as claimed in claim 5, a fourth means in said repeater responsive to the pulsing by said operator, received as removals of potential from said second signal channel to pulse said selector, the fifth means in said repeater responsive to said operator conditioning said repeater for the receiving of the dial pulses to cause said repeater to remove said first potential from said first signal channel, said first signal channel thereafter effective to signal said operator of stop-dial condition in a remote exchange or of the called party answer condition.

8. In a telephone system as claimed in claim 5, a fourth means in said repeater responsive to the dial pulses from said operator position received as removals of said first potential from said second signal channel to pulse said selector, a fifth means in said repeater responsive to said operator conditioning said repeater for the receiving of the dial pulses to cause said repeater to remove said first potential from said first signal channel, said fifth means effective to condition another means whereby said operator transmission path is removed from a completed connection to thereby improve transmission between the calling and called parties.

9. In a telephone system including a first and a second exchange, an operator's position in said first exchange, a dial-back trunk circuit connected to said operator's position, a dial-back repeater circuit in said second exchange, said repeater and said trunk circuits linked by means of carrier channels comprising a transmission channel and three unidirectional channels, said repeater and trunk circuits characterized by a first means in said repeater for signalling through said trunk circuit of a calling line condition to said operator of a stop-dial condition on a dial-back or extended call and of a called party answer condition, a second means in said trunk circuit effective to signal said repeater of an operator answer and to connect her transmission circuit to said calling line and after the determination of the call as requiring dial back to be used for dialing through the repeater, a third signal means in said trunk circuit responsive to the operator plugging a cord into a dial-back jack to signal said repeater to seize a selector.

References Cited in the file of this patent

UNITED STATES PATENTS

| | | |
|---|---|---|
| 2,621,252 | Balzer | Dec. 9, 1952 |
| 2,744,965 | Molnar | May 8, 1956 |